Jan. 16, 1934. T. A. MITCHELL 1,943,338
METHOD OF TREATING TIN BEARING ORES
Filed May 25, 1931
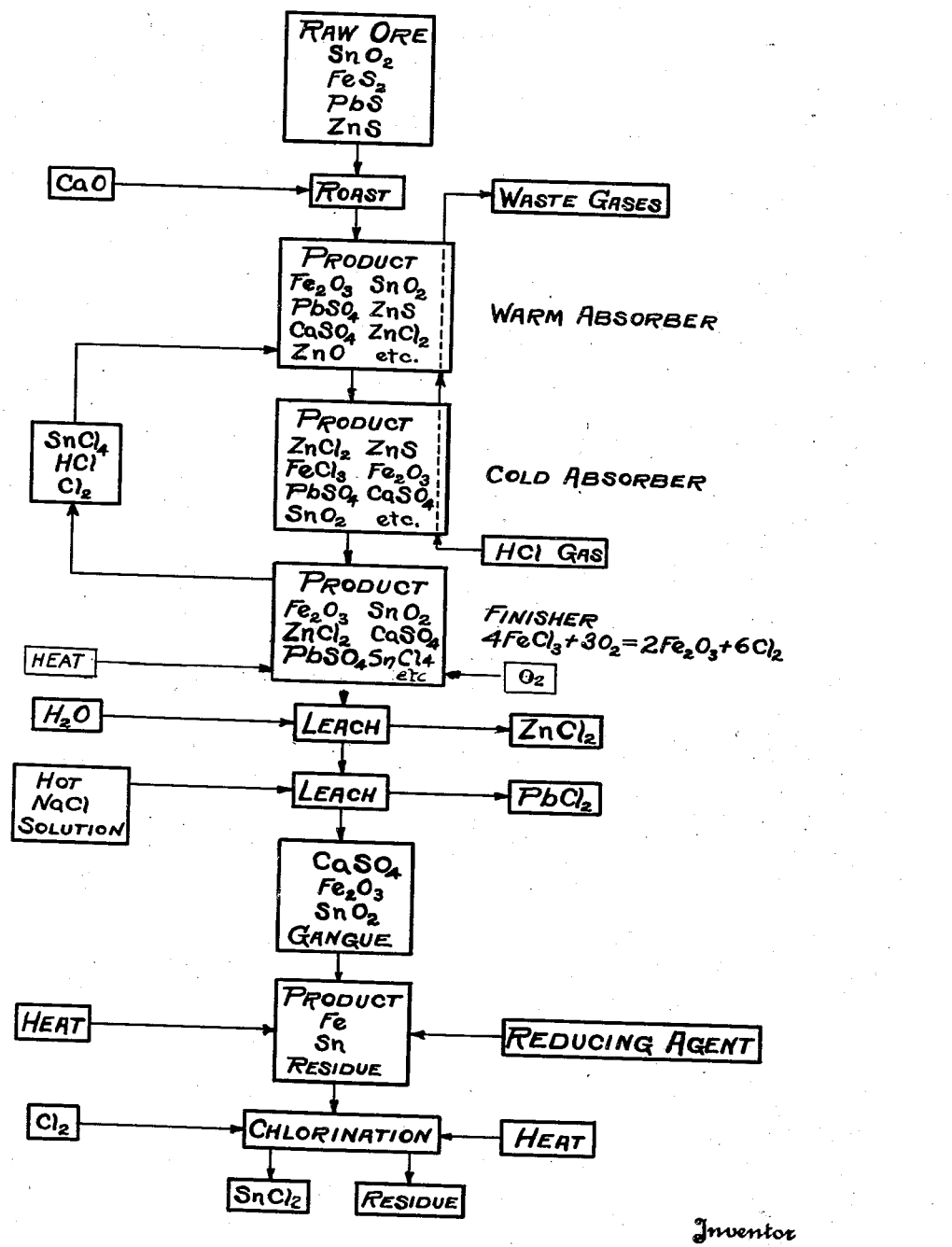
Inventor
THOMAS A. MITCHELL
By Clayton R. Jenks
Attorney Patented Jan. 16, 1934

1,943,338

UNITED STATES PATENT OFFICE

1,943,338

METHOD OF TREATING TIN BEARING ORES

Thomas A. Mitchell, Denver, Colo., assignor to Lafayette M. Hughes, Denver, Colo.

Application May 25, 1931. Serial No. 539,820

19 Claims. (Cl. 75—18)

This invention relates to the treatment of tin bearing ores and particularly to the treatment of complex ores containing compounds of tin and other metals whereby the valuable metals may be separated and recovered.

Tin occurs in nature as stannite, which is a triple sulfide of tin, copper and iron, but it is generally found as cassiterite or stannic oxide. This mineral is commonly associated in the same vein with the sulfides of zinc, copper, lead and iron. By mechanical concentration methods the ore may be concentrated to give perhaps 60% of tin, but the tin concentrates are still contaminated with the sulfides of the other metals as well as the rock gangue. The problem has been to recover the tin without sacrificing some of the other ore values, or to avoid losing tin if the process is carried out primarily for the recovery of another ore metal.

One standard practice for recovering tin from such ores has involved roasting to remove sulfide sulfur and finally smelting the product containing the cassiterite with carbon to reduce the tin oxide to the metallic form. It has been found that the smelting operation is inefficient, particularly because of the contamination of the tin ore with other materials. The reduction of tin from its oxide by means of carbon is not difficult, but considerable tin is lost because it combines easily with the silica present to form tin silicate, a readily fusible material which goes with the complex silicates constituting the slag. The loss of tin in this way may be so high as to require refining the slag in a subsequent smelting operation. Also some tin alloys with the iron and must be separated from it by a further smelting operation. If the ore contains other values, such as lead, silver, copper and zinc, they are not satisfactorily recovered by such a procedure.

This ore has also been treated in various other ways, such as by roasting and then leaching out some of the ore metal values by an acid. Such roasting operations tend to form hard, indurate and vitreous masses which are not easily treated by liquid reagents; hence in such processes there is considerable likelihood of ore metals being lost or not being efficiently recovered.

A further procedure heretofore practiced has involved a chloridizing roast for the complex concentrates. For example, the mixture is roasted with sodium chloride in an oxidizing atmosphere and the sulfur is removed as sodium sulfate. It is desirable in this type of operation that the tin remain unaffected in the oxide form so that it may be reduced to a metal by a subsequent smelting operation. It is, however, found that some of the tin is volatilized as a chloride and is lost, or else it must be recovered by a special treatment of the fumes. For many such reasons as these, it has not been easy to recover tin from a complex ore in which it is found mixed with various other valuable metals as well as undesired impurities.

It is accordingly the primary object of this invention to provide a simple, efficient and economical method of treating a complex ore containing a tin compound and of recovering values therefrom, and particularly to separate the other ore metals from the tin so that each may be satisfactorily recovered.

Cassiterite is crystallized stannic oxide ($SnO_2$) which is insoluble towards most chemicals. However, when reduced to the lower oxide of tin, stannous oxide ($SnO$), its solubility is greatly increased. When still further reduced to the metallic form then it is easily combined with chlorine to form a chloride which may be readily recovered. In accordance with one phase of my invention, I propose to treat a complex tin ore by a combination of roasting and chloridizing steps which are so carried on as to separate and recover not only the tin but also the other desired metal values of the ore. It is found to be difficult, however, to prevent the formation of some stannic chloride when the roasted material is chloridized, hence the tin may be present in the reaction zone as both an oxide and the highly volatile chloride. It is therefore a further object of my invention to provide a method of chloridizing a complex tin bearing ore which insures that while other metals are being chloridized any tin chloride present will be dechloridized and the tin caused to remain largely as a single chemical compound which may be readily separated from the other ore metal values and recovered.

In accordance with my invention, I propose to chloridize a tin ore in such a manner that the tin comes from the process in the dioxide form irrespective of the nature of the tin compound found in the original ore or formed in the intermediate stages of the process. To this end, I propose to roast an ore under conditions which bring ore metals other than tin into an easily chloridizable form and then to treat this roasted product in such a manner as to chloridize such metals and to cause the tin to remain wholly in the stannic oxide form and so go with the residue for subsequent operations in which the metal values are recovered.

As a more general application of this process,

I propose to dechloridize tin chloride however formed and whether present with other materials or found alone and to convert it to the oxide form. This is accomplished by treating the tin chloride with zinc oxide, which is capable of converting the tin compound to an oxide. In the specific process herein described, stannic chloride is volatilized and the fumes are passed over dry zinc oxide, thereby forming tin dioxide and zinc chloride.

Referring to the drawing which illustrates one manner of treating a complex ore, I have there shown the essential steps required for treating a complex Bolivian ore, one type of which may analyze 10% of cassiterite, 5% of lead sulfide, 10% zinc sulfide and a large amount of iron sulfide, as well as small amounts of compounds of other metals, such as silver, tungsten and molybdenum.

It is primarily desirable to so treat such a complex ore that zinc and other metals of the same class may be completely chloridized. An ordinary oxidizing roast tends to produce both zinc sulfate and zinc oxide. I therefore propose to roast the ore in the presence of a compound of an alkaline earth metal, such as the oxide, hydroxide or carbonate of calcium, strontium or barium, and preferably lime, so as to insure that all available sulfate radical is fixed as an alkaline earth metal sulfate and the zinc is compelled to go to the oxide form. To this end, I provide sufficient alkaline earth material to react with all available sulfate radical which might react with such metals as zinc and form some sulfate along with the oxide. Lead tends to go to the sulfate form preferentially and is not affected by the alkaline earth. It is furthermore desirable that the ore and the lime, which is preferably used, be finely divided and brought into intimate contact, such as by grinding and mixing them in water, whereby the lime will be first transformed to the hydrate and then later returned to the oxide form when the material is dried and roasted. An ordinary roasting operation without this alkaline earth material tends to form a hard, indurate sintered or vitreous mass which is not easily chloridized or otherwise treated by the leaching reagent. But this finely divided alkaline earth material interspersed with the ore particles serves to leave the roasted material in a porous and open condition easily attacked by the subsequent gaseous or liquid reagent. In order to have an adequate amount present, I preferably provide alkaline earth material in such an amount that 5 or 10% of the total weight of the material is made up thereof.

Furthermore, the roasting operation is carried on at as low a temperature as is compatible with burning off the sulfide sulfur so as to minimize the danger of forming a sinter or vitreous mass. If the material does not contain sufficient sulfur or other combustible material to attain a satisfactory temperature for the purpose, then suitable fuel, such as oil or gas, may be utilized to raise the temperature of the mass or more metal sulfide may be added. However, in the case of the ore above described the reaction is autogenous and the material is allowed to attain that temperature at which the sulfur will normally burn, but it will be understood that the temperature should be controlled and maintained as low as possible to prevent the formation of a vitreous body.

If the roasting operation is one involving a reducing action, there is a tendency for any lead and silver present to combine as a triple alloy of silver, lead and tin, thus causing a low recovery of these metals. Also, since a reducing action tends to form the lower oxide of tin, which is more easily attacked by chemical reagents, then a subsequent chloridizing operation may serve to form some tin chloride, which is highly volatile and may be lost or present problems for its recovery. It is therefore desirable that the roasting operation be carried on under oxidizing conditions and at a low temperature so that the silver will be present as an oxide and the lead as either oxide or sulfate, while the formation of these complex alloys or of the lower oxide of tin will be prevented or minimized. As a result of this roasting operation, which is carried on under oxidizing conditions, the roasted product is a pulverulent material or one which is easily crumbled, made up of ferric oxide, zinc oxide, lead sulfate, tin oxide and calcium sulfate as well as the gangue and various other materials such as tungsten and molybdenum oxide. Silver will be found as an oxide or in the metallic state, and will be chloridized in the subsequent stages.

Of the various methods which I may employ to chloridize the zinc found in this roasted material, I prefer to treat the roast by the process set forth and claimed in my copending application Serial No. 687,827 filed September 1, 1933, in accordance with which the ore material is treated in a substantially dry condition with hydrochloric acid gas, which is capable of uniting with zinc oxide to form zinc chloride, and with chlorine gas which attacks the residual sulfide and other difficultly chloridized compounds. For this purpose I may utilize two pieces of apparatus, herein termed the "absorber" and the "finisher", whereby the chloridizing operation may take place in two steps, the first for absorbing HCl and the second for recovering and using the chlorine combined with iron. The absorption step, during which the hydrochloric acid gas is taken up by the zinc oxide, may also be divided into two stages, the first being that of chloridizing the material while still in a warm condition as derived from the roaster to form zinc chloride and the second involving treating it in the presence of the water of reaction and while in a cold condition to complete the chloridization of the zinc oxide and to form ferric chloride in quantity sufficient for the finisher stage.

The absorbers may comprise various types of apparatus, such as two rotary tubes so arranged that the material is transported from the upper to the lower end of each tube while it is showered through the gaseous atmosphere therein. Hydrochloric acid gas is introduced into the lower end of the second or cold absorber and the excess of gas is permitted to travel in counterflow relation with the material from the cold absorber into the warm absorber so that any unused gas will be taken up by the material coming from the roaster. The hydrochloric acid gas reacts with zinc oxide to form zinc chloride and water, and after the zinc has been satisfied the gas then attacks the iron oxide to form ferric chloride. Consequently, the chief result to be accomplished in the absorbers is the formation of the zinc and ferric chlorides, leaving the lead sulfate, calcium sulfate and stannic oxide untouched.

Since some of the chloride ion of the hydrochloric acid goes to form iron chloride, then a further stage of this invention involves the recovery of the chlorine thus combined and its being put to useful work in chloridizing other portions of the ore. This is accomplished by raising the temperature of the chloridized material to a point at which ferric chloride is not stable and by providing sufficient oxygen so that the ferric chloride and oxygen may react to form iron oxide and release the combined chlorine, which may appear as chlorine gas or, due to the presence of water, as chloridion in hydrochloric acid, or as a combination of both. The reaction may, however, be represented as taking place simply in accordance with the equation:

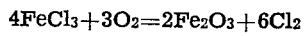

$$4FeCl_3 + 3O_2 = 2Fe_2O_3 + 6Cl_2$$

This is accomplished preferably in a separate piece of apparatus herein termed the finisher. This device may be a long rotary tube of the same general type as those used for the absorbers, in which the material passes from the entrance end towards the exit, where a temperature is maintained at about 300° C. or sufficiently high to insure ferric chloride breaking down to ferric oxide and chlorine, an oxidizing atmosphere being maintained for this purpose. The water vapor which is present in the cold absorber tends to dissolve the iron chloride and bring it into intimate contact with the ore particles. Consequently as the material travels lengthwise of the finisher and is gradually heated, it is decomposed to form chlorine in close association with the unchloridized portions of the ore. This chlorine is in a nascent state and is capable of chloridizing any unconverted metal sulfides which have come through the roasting operation as well as such difficultly chloridized materials as zinc silicate, zinc ferrate and other complex compounds. As a result, substantially all of the zinc present in the ore is converted to a chloride. It will be understood that the absorber and finisher reactions take place in the presence of excess alkaline earth metal chloride or oxide, hence all available sulfate radical, which may be present or be formed during the step of chloridizing the residual sulfides in the incompletely roasted ore, will be fixed as an alkaline earth metal sulfate and prevented from sulfating the zinc. It is not necessary that the roasting operation be carried to completion, since a partially roasted sulfide ore may be chloridized by the treatment here specified, provided a sufficient amount of alkaline earth material is present to fix the sulfur or the sulfate radical present, as above described.

I have discovered that a certain portion of the tin of the ore becomes converted to stannic chloride during the absorber and finisher stages of this process although a large part of the tin remains in the oxide form, hence, since the tin chloride is a volatile gas at the temperature of the finisher, it would be lost except for the special methods of recovery herein described.

In accordance with this phase of my invention I propose to dechloridize the stannic chloride by causing it to react with zinc oxide. To accomplish this end, I pass the volatilized tin chloride over zinc oxide and maintain conditions which cause the formation of zinc chloride and stannic oxide. This step is preferably accomplished in the presence of the various ingredients of the roasted ore containing the zinc oxide, and in particular by returning the volatilized tin chloride into contact with the hot dry ore after it leaves the roaster. If zinc is not present in the ore, then this dechloridizing of the stannic chloride may be accomplished at a subsequent stage by passing the gases taken from the absorbers or the finisher through a further apparatus in which they are brought into intimate contact with dry zinc oxide. As shown in the drawing, this operation may be accomplished by passing the volatile materials and gases containing the stannic chloride, hydrochloric acid and chlorine gas from the finisher into the warm or first absorber, where dry zinc oxide is present. In this chamber we therefore have the reaction of the stannic chloride in the vapor phase with the zinc oxide to form zinc chloride and stannic oxide, while the hydrochloric acid and chlorine gas will react with further zinc oxide or other chloridizable materials in the warm absorber.

This step of the process is based on the fact that when tin chloride comes into contact with a base in water solution, it is precipitated as tin hydrate which is easily soluble in acid such as hydrochloric acid, while if stannic chloride in vapor phase is passed over dry zinc oxide, stannic oxide is formed. In the cold absorber, there is some tendency for stannic chloride to react with zinc oxide in the presence of water to form the hydrate of tin, and this may be reconverted to tin chloride by the hydrochloric acid. This moisture comes from the reaction of hydrochloric acid on zinc oxide. In the first hot absorber, the zinc oxide is dry and this reaction does not take place, but the tin chloride is dechloridized and converted to stannic oxide which is not readily attacked by the hydrochloric acid. It is also possible that tin chloride is developed during the process because of other reasons. If tin sulfide is present, it may be attacked by chlorine gas in the presence of water to form stannic chloride. In a complex ore, such as may be treated by this process, there may be side reactions tending towards this volatilization of tin as a chloride.

It will therefore be seen that if stannic chloride is formed in the cold absorber or the finisher, it will volatilize and go in a cyclic process back into the warm absorber for conversion to stannic oxide. Thus any stannic chloride which may be developed cannot escape from the chloridizing zone but must be converted to stannic oxide.

Successful chloridization of such metals as zinc in accordance with this process is best carried out by keeping the product in a dry to damp condition although never in a wet condition. Consequently, an attack on the cassiterite by the chloridizing materials present is not promoted, since the cassiterite is converted best to the chloride form when in a wet condition. If there is a high content of zinc and iron oxides in the absorber material, and a consequent production of a large amount of water due to the reaction with hydrochloric acid, steps may be taken to reduce this moisture content, as by evaporation and removal of the water vapor or by other suitable methods so that the chloridization of the stannic oxide will be minimized.

If sulfides remain in the roast, they will be chloridized by the chlorine in the presence of the alkaline earth material which takes up all available sulfate radical produced by the oxidizing conditions of the roast. Hence, this process applies also to the treatment of ore metal sulfides which have been only partially or incompletely roasted, or where roasted and unroasted material have been mixed. In any case the stannic chloride produced during the chloridizing reaction is dechloridized and forced to remain as an oxide, so as to permit the other ore metals to be chloridized and removed.

It will now be appreciated that the product coming from the finisher consists chiefly of ferric oxide, calcium sulfate, zinc chloride, lead sulfate and stannic oxide as well as the gangue of the ore. The ore metal values may now be readily separated by suitable treatments. For example, one may now leach out the soluble zinc chloride by means of water and the residue may then be properly treated as with a hot NaCl solution for recovering the lead as a chloride. If silver is present, it may be recovered with the lead. This leaves iron oxide and tin oxide as a residue, along with the calcium sulfate and other inert materials or unrecovered values such as molybdenum and tungsten oxides. One may recover the tin from this residue by various procedures, such as by the smelting or reducing operations of the prior art, whereby the tin may be reduced to the metallic form and then treated with chlorine gas for conversion to tin chloride which is caught in a condenser and thus separated from the gangue and other materials forming the residue. If iron is present with the reduced tin, the treatment with chlorine gas may be made selective so as to chloridize the tin and not the iron. This is accomplished by maintaining oxidizing conditions and keeping the temperature above that at which ferric chloride is stable. Thereafter the tin chloride may be passed into water and converted to an oxide and then reduced to the metal, or various other procedures may be adopted within the knowledge of those skilled in the art.

It will now be appreciated that I have provided a very simple and practical method of separating the valuable lead and zinc as well as the iron and other undesired materials from the tin of this complex ore. This process applies not only to complex ores but also to the simple ores, and whether concentrates or ores in their raw condition. By this process I have insured that the tin goes wholly with the residue and that none escapes because of its being converted to a volatile chloride during the chloridizing operation. The process is useful wherever it is desired to prevent the production or accumulation of stannic chloride in a chloridizing process.

It will be appreciated in view of the above disclosure that this invention has a general application to the dechloridization of stannic chloride, wherever found or produced. If volatile fumes of this material are produced in a given metallurgical process and it is desired to capture them as stannic oxide, this is easily accomplished by passing the volatilized stannic chloride into contact with substantially dry zinc oxide, thereby forming stannic oxide and zinc chloride. The zinc salt may be later dissolved by means of water, hence if all of the zinc has been chloridized, a simple way of recovering the tin oxide is provided. This procedure fits into various schemes for chloridizing a complex tin bearing ore, and permits the process to be carried on in such a manner that other metal values may be chloridized and recovered without regard to the fact that the treatment may affect some of the tin; since any stannic chloride thus produced is reconverted to a dechloridized condition and so permits the separation and recovery of another ore metal chloride while the tin is held as an inert material with the residue. Hence the claims are to be interpreted in the light of this disclosure and not considered limited to the specific application of the invention above described.

Having thus described my invention, what I claim as new and desire to secure by Letters Patent is:

1. The method of dechloridizing stannic chloride comprising the steps of treating it with zinc oxide and maintaining conditions which cause the formation of stannic oxide and thereafter separating the zinc chloride thus formed from the tin oxide.

2. The method of dechloridizing stannic chloride comprising the steps of passing it in a volatilized condition into contact with hot dry zinc oxide and thereby forming stannic oxide and zinc chloride, and subsequently separating said products.

3. The method of dechloridizing stannic chloride comprising the steps of roasting a sulfide ore containing zinc sulfide to form an oxide thereof and then treating the stannic chloride with said roasted material in a substantially dry condition and thereby forming zinc chloride and stannic oxide, and subsequently separating and recovering zinc and tin compounds from the ore material.

4. The method of treating a complex sulfide ore containing compounds of tin and another valuable metal comprising the steps of roasting the ore to produce an oxide of said ore metal and thereafter chloridizing the roasted material and treating any tin chloride there formed in the vapor phase with substantially dry zinc oxide and converting the tin chloride vapor to tin oxide.

5. The method of treating a complex ore material containing compounds of tin and another valuable metal comprising the steps of chloridizing said metal at a temperature at which tin chloride is volatile, converting any volatilized tin chloride formed during the process to tin oxide, and thereafter separating the metal chloride from the tin oxide.

6. The method of treating an ore containing zinc sulfide comprising the steps of roasting it to form zinc oxide, passing stannic chloride fumes over the roast while hot and dry to form stannic oxide and zinc chloride and subsequently completing the chloridization of the zinc oxide in the presence of the stannic oxide.

7. The method of treating a complex ore material containing compounds of tin and another metal comprising the steps of treating the ore material with a chloridizing agent and in the presence of water to form a chloride of said metal, volatilizing any stannic chloride formed during the chloridizing step and treating it in the vapor phase with zinc oxide and thereby forming stannic oxide and subsequently recovering a tin compound therefrom.

8. The method of treating a complex tin and zinc bearing sulfide ore comprising the steps of roasting the ore to form zinc oxide, treating the dry roasted material with volatilized stannic chloride derived from a later stage of the process to form stannic oxide, chloridizing said zinc oxide, volatilizing any stannic chloride formed and returning it for said treatment with the roasted material, thereby preventing the escape of stannic chloride from the chloridizing zone.

9. The method of treating a complex sulfide ore containing a tin compound comprising the steps of roasting the ore in the presence of an alkaline earth metal oxide, chloridizing the roast in the presence of water, heating the material to a temperature at which stannic chloride is volatile, passing any stannic chloride present in the vapor phase into contact with dry zinc oxide to form stannic oxide and zinc chloride therewith and subsequently separating the soluble zinc chloride from the tin oxide and recovering a tin compound therefrom.

10. The method of treating a complex sulfide ore containing tin, iron and zinc compounds comprising the steps of roasting the ore to produce iron and zinc oxides, passing hydrochloric acid into contact with the roast, thereafter subjecting it to the action of chlorine and heating the chloridized material to a temperature at which any stannic chloride present will be volatilized, returning the volatilized chloride to contact with the roasted ore in a dry condition and produce stannic oxide, and subsequently removing metal chlorides and leaving stannic oxide with the residue for recovery therefrom.

11. The method of treating a complex ore material containing a compound of tin and the sulfide of a valuable metal comprising the steps of roasting the ore, then treating the material with a gaseous chloridizing reagent in the presence of alkaline earth material capable of and proportioned for fixing any available sulfate radical as an insoluble sulfate and forming a chloride of said metal, causing the tin to remain in the batch as an oxide and thereafter separating the compounds of said metal and the tin.

12. The method of treating a complex ore containing a tin compound and a metal sulfide comprising the steps of partially roasting the material to form an oxygen compound of said metal, treating the roast with a chloridizing reagent in the presence of sufficient alkaline earth material to react with available sulfate radical formed by oxidation of residual ore metal sulfide and thereby forming a chloride of said metal, converting any tin chloride formed during the reaction into stannic oxide and thereafter separating the tin oxide and the metal chloride for recovery thereof.

13. The method of treating a complex ore containing a compound of tin and an ore metal sulfide comprising the steps of roasting the ore under oxidizing conditions, treating the roasted ore in a substantiallly dry but slightly moist condition with a chloridizing agent capable of forming a chloride of an ore metal oxide, volatilizing any stannic chloride formed during the chloridizing operation and causing it to react with a substantially dry zinc oxide and converting the stannic chloride to stannic oxide, and thereafter recovering a tin compound from the ore mixture.

14. The method of treating an ore containing a tin compound and zinc sulfide comprising the steps of roasting the ore under oxidizing conditions to form zinc oxide, chloridizing the roast in a substantially dry but slightly moist condition by means of hydrochloric acid gas, volatilizing any stannic chloride thus formed and passing it in the vapor phase over the dry roasted material containing said oxide and converting the tin chloride to tin oxide, and thereafter recovering a tin compound.

15. The method of treating a complex ore containing tin oxide and an ore metal compound comprising the steps of chloridizing the ore metal to form a chloride thereof, volatilizing any stannic chloride which may have been formed and passing the vapor over dry zinc oxide to form stannic oxide and zinc chloride, separating the zinc chloride from the tin oxide, reducing the tin oxide to the metallic condition and then chloridizing it with chlorine gas.

16. The method of treating a complex sulfide ore containing zinc sulfide and tin oxide comprising the steps of roasting the ore under oxidizing conditions, treating the roasted material with hydrochloric acid gas to form zinc chloride, subjecting the partially chloridized ore material to the action of chlorine at a temperature at which stannic chloride is volatilized, returning any volatilized material thus formed to an initial stage in the process and passing the tin chloride vapor over the dry roasted ore material containing zinc oxide in order to form stannic oxide, and thereafter converting the tin oxide to a recoverable form and separating it from the ore materials.

17. The method of treating a complex sulfide ore containing a tin compound and sulfides of iron and zinc comprising the steps of roasting the material to form zinc and iron oxides, passing the roasted material through a warm absorber where it is held in a hot dry condition, then treating the material with hydrochloric acid gas to form zinc and iron chlorides and water, thereafter heating the material under oxidizing conditions to a temperature at which ferric chloride is not stable and volatilizing any stannic chloride which may have been previously formed, returning this stannic chloride in the vapor phase to the warm absorber and causing it to contact with the hot dry zinc oxide and be reconverted to stannic oxide, thereafter separating zinc chloride from the finished product and subsequently recovering a tin compound from the residue.

18. The method of treating an ore containing zinc sulfide and a compound of tin comprising the steps of roasting the ore to form zinc oxide and subsequently treating the roasted product with a chloridizing agent to form zinc chloride, evaporating and returning any stannic chloride thus formed into contact with the roasted ore in a substantially dry condition and converting it to stannic oxide, and dissolving the zinc chloride from the chloridized material, whereby the tin may be recovered from the chloridizing treatment in the form of an oxide.

19. The method of claim 18 in which the ore is roasted in a finely divided condition with lime in excess of that required to fix the available sulfate radical as calcium sulfate, and the subsequent dechloridization of the tin chloride and the chloridization of the zinc compounds are effected in the presence of a compound of calcium.

THOMAS A. MITCHELL.